United States Patent Office 2,981,759
Patented Apr. 25, 1961

2,981,759

STABILIZATION OF CHLORINATED HYDROCARBONS WITH A SYNERGISTIC COMBINATION OF A TERTIARY ACETYLENIC ALCOHOL, DIOXANE, AND A VOLATILE BASIC ORGANIC NITROGEN-CONTAINING ORGANIC COMPOUND

Gordon E. Cole, Jr., Cos Cob, Conn., and Charles O. Herman, Nixon, N.J., assignors to Air Reduction Company, Incorporated, New York, N.Y., a corporation of New York No Drawing. Filed Feb. 8, 1956, Ser. No. 564,118

3 Claims. (Cl. 260—652.5)

This invention relates to the stabilization of chlorinated hydrocarbons. More particularly, it relates to the stabilization of chlorinated hydrocarbon solvents against degradation when exposed to heat, light, and air; and it comprises a method of accomplishing such stabilization.

The term "stabilization," in its various forms, as used in this specification and the appended claims, is intended to refer to the inhibition of the decomposition reaction and/or the neutralization of any deleterious decomposition products.

The chlorinated hydrocarbons are widely used, among other things, as solvents in degreasing metallic articles, extracting caffiein from coffee and in dry cleaning. The principal shortcoming of chlorinated hydrocarbons is their tendency to decompose when exposed to heat, light, and air with the formation of products, usually acidic in nature, having objectionable properties. The presence of even small amounts of such acid substances cannot be tolerated since the solvents normally come into contact with metallic articles. Furthermore, the acid substances are detrimental to fabrics and to many dyes. While many chemical additives have been suggested for incorporation in chlorinated solvents to inhibit their decomposition or to react with or neutralize the objectionable substances formed by the degradation of such solvents, there is a need for improvement in the ability of these chemical additives or stabilizers to prevent the degradation of chlorinated hydrocarbon solvents.

It is an object of the present invention to provide a chlorinated hydrocarbon solvent having improved stability. An additional object is to provide a mixture of stabilizing materials which will exert a synergistic effect one with the other so that chlorinated hydrocarbon solvents are more effectively stabilized with the mixture than with either stabilizing material alone. A further object is to provide an improved process for stabilizing chlorinated hydrocarbons. Other objects will in part appear in, and in part be obvious from, the following detailed description.

An important contribution in the field of stabilization of chlorinated hydrocarbon solvents has been the discovery that tertiary acetylenic monohydric alcohols may be used as stabilizers. The tertiary acetylenic monohydric alcohols which have been found effective may be represented by the formula

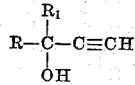

wherein R is an alkyl group containing from 1 through 6 carbon atoms and $R_1$ may be an alkyl, aryl, alkaryl, or cycloalkyl radical. The following compounds are representative of those encompassed by the foregoing formula:

2-methyl-3-butyn-2-ol
3-methyl-1-pentyn-3-ol
3-methyl-1-nonyn-3-ol
3,5-dimethyl-1-hexyn-3-ol
2-phenyl-3-butyn-2-ol The use of these compounds as stabilizers for chlorinated hydrocarbon solvents is more fully described and disclosed in the copending application of Warren C. Ellis, Jr. and Morton W. Leeds, Serial No. 408,978, filed on February 8, 1954. Due to the wide variety of uses and conditions to which the chlorinated hydrocarbon solvents are put, it has been found necessary, in many cases, to supplement the stabilizing activity of the tertiary monohydric acetylenic alcohols with an additional material or materials.

Another class of materials which have found favor as additives for the stabilization of chlorinated hydrocarbon solvents are the volatile (i.e., boiling point 150° C. or below) basic nitrogen-containing organic compounds. They have been found particularly useful in retarding solvent degradation due to exposure of the solvent to light and air.

Since the tertiary acetylenic monohydric alcohols have been found to be particularly effective in reducing the corrosive effects of the chlorinated solvents degradation products, and since the volatile basic nitrogen-containing organic compounds have been found particularly suitable in retarding light and air induced degradation of the solvents, it would be desirable to provide a chlorinated hydrocarbon stabilizing system comprising a tertiary acetylenic monohydric alcohol and a volatile basic nitrogen-containing organic compound. However, previous attempts to employ such a combination to stabilize chlorinated hydrocarbon solvents have not been successful. This is believed to be due to the fact that the tertiary acetylenic monohydric alcohol and the volatile basic organic nitrogen-containing compound are incompatible, and the combination of two materials has, heretofore, accelerated solvent degradation and metal corrosion.

In accordance with this invention, it has now been found that if a small amount of dioxane is incorporated in, or admixed with, a tertiary acetylenic monohydric alcohol and a volatile basic nitrogen-containing nitrogen compound then not only is each of the ingredients in the mixture compatible with any of the others, but also the three component mixture comprising a tertiary acetylenic monohydric alcohol, a volatile basic nitrogen-containing organic compound and dioxane is unusually effective in stabilizing chlorinated hydrocarbons. This three component mixture has been found to enhance solvent stability and retard metal corrosion. Furthermore, this combination of three materials exerts a stabilizing effect upon chlorinated hydrocarbons solvents which is greater than additive with respect to the effect exerted by its components separately. In addition, chlorinated hydrocarbons stabilized with this combination of materials may be used for a wider variety of uses and under more extreme conditions without fear of the formation of objectionable amounts of acid products. Still further, it has also been found that this combination of materials exerts an unexpected anti-corrosive effect when the solvent is employed for the vapor phase degreasing of metallic articles.

We have found that this synergistic stabilizing activity may be obtained with a combination of dioxane with any of the tertiary acetylenic monohydric alcohols represented by the formula

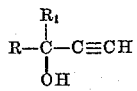

where R and $R_1$ have the same meaning as given above, and any volatile basic nitrogen-containing organic compound. The tertiary acetylenic monohydric alcohols which have been found especially suitable in this mixture are 2-methyl-3-butyn-2-ol and 3-methyl-1-pentyn-3-ol.

The volatile (i.e., boiling point 150° C. or below) basic nitrogen-containing organic compounds which have been found suitable include aliphatic amines, such as mono-, di-, and trialkanolamine, triethylamine, diisopropylamine, diisobutylamine, and the like; heterocyclic nitrogen compounds, such as pyridine, morpholine, N-methyl morpholine, pyrrole, N-methyl pyrrole, and the like; and the nitrogen-oxygen containing compounds, such as the organic oximes described in U.S.P. 2,371,646 to W. H. Petering, et al. issued March 20, 1945, e.g., formaldoxime, acetaldoxime, etc. Triethylamine, diisopropylamine, pyrrole, and N-methyl pyrrole have been found to be particularly useful.

While the amount of stabilizer mixture incorporated in the chlorohydrocarbon solvent will depend upon the particular solvent to be stabilized, the intended use of the solvent composition, and the degree of stability desired, generally, the amount of the mixture of dioxane, tertiary acetylenic monohydric alcohol and volatile basic nitrogen-containing organic compound incorporated in the chlorinated solvent may range from as low as about 0.01 percent by weight to about 1.0 percent by weight. Any suitable proportion of one additive to another may be used. Usually the volatile basic nitrogen-containing compound is present in an amount of from about 0.001 to 0.1 percent by weight, and dioxane and the tertiary acetylenic monohydric alcohol are usually present in an amount of from about 0.05 to 0.95 percent by weight.

When operating in accordance with this invention, the three stabilizing materials may simply be mixed together to form a composition adapted to be subsequently incorporated in the chlorinated hydrocarbon solvent to be stabilized, or each of the stabilizer ingredients may be individually added to the chlorohydrocarbon solvent. For certain applications of the chlorinated hydrocarbon solvents, it may be desirable to add other stabilizing agents, such as phenolic substances, e.g. thymol, resorcinol, catechol, etc., or unsaturated materials, e.g. diisobutylene and the like.

While the combination of dioxane, tertiary acetylenic monohydric alcohol, and volatile basic nitrogen-containing organic compound has been found to be particularly effective for the stabilization of trichloroethylene and perchloroethylene, the mixture may also be used to stabilize other chlorohydrocarbons such as methyl chloroform, methylene chloride, ethylene dichloride, trichloroethane, and the like.

The following table will illustrate the unexpected synergistic stabilizing effects obtainable by employing a stabilizing system comprising dioxane, a tertiary acetylenic monohydric alcohol, and a volatile basic nitrogen-containing organic compound. In each run, ½ ml. of water was added to 500 grams of a commercial grade of trichloroethylene, having an initial pH of 10.7, and containing the stabilizer system in the amounts indicated in Table I. A strip measuring about 1½" x ½" of each of aluminum foil, galvanized iron, and mild steel was suspended in the vapor phase of the refluxing solvent.

After refluxing the solvent for the period recorded in Table I, measurement was made of the final pH of the mixture. The solvent mixture and the metal strips were visually examined for degradation and corrosion. Both the degree of solvent degradation and metal corrosion were rated on an arbitrary scale from 1 to 9, from best to worst. The concentrations indicated are percent by weight.

*Table I*

| Stabilizer System | Reflux Time (Hrs.) | Final pH | Solvent Degradation | Metal Corrosion | | |
|---|---|---|---|---|---|---|
| | | | | Al | Galv. Iron | Steel |
| 0.075% diisopropylamine 0.2% 3-methyl-1-pentyn-3-ol | 335 | 5.9 | 5 | 7 | 9 | 4 |
| 0.075% diisopropylamine 0.3% 3-methyl-1-pentyn-3-ol 0.1% dioxane | 311 | 10.5 | 2 | 6 | 2 | 3 |

It will be noted that trichloroethylene stabilized with the mixture of 3-methyl-1-pentyn-3-ol, dioxane, and diisopropylamine had a final pH of 10.5 compared to a pH of 5.9 for trichloroethylene stabilized with 3-methyl-1-pentyn-3-ol and diisopropylamine, demonstrating the superior ability of the three component mixture to control the formation of acid products. Furthermore, metal corrosion was noticeably reduced, especially with respect to galvanized iron, when the three component system was employed.

It has also been found that the combination of dioxane and a tertiary acetylenic monohydric alcohol as a stabilizing system for trichloroethylene possesses unusually effective stabilizing properties in that trichloroethylene containing this mixture of ingredients is more stable against degradation than when either of the ingredients is employed alone. This mixture of ingredients not only synergistically inhibits the degradation of trichloroethylene, but also mitigates the harmful effects of such degradation. Combinations of dioxane with 3-methyl-1-pentyn-3-ol or 2-methyl-3-butyn-2-ol have been found to be especially suitable for the stabilizing of trichloroethylene.

The results of the experiments set forth in Table II will illustrate the synergistic stabilizing effects obtainable by employing a combination of a tertiary acetylenic monohydric alcohol and dioxane for the stabilization of trichloroethylene. In each case the stabilizer system was added, in the amounts indicated, to 150 ml. of trichloroethylene containing 7.5 ml. of water and 4 grams each of finely divided aluminum (8–20 mesh), iron (40 mesh), zinc (40 mesh), and fine copper turnings. The water and finely divided metals were added to accelerate solvent decomposition. The trichloroethylene employed had previously been purified by passing it through a column packed with alumina. Cleaned metal specimens, measuring 2" x ½" x 1/16", of each of iron, copper, zinc, and aluminum were suspended at three different locations: (1) half in and half out of the liquid, (2) in the boiling vapors, and (3) halfway immersed in the condensate. After refluxing the solvent mixture for 144 hours, the metal specimens were removed. Those specimens which were in the liquid phase were rinsed into the flask. The metal specimens were visually examined for corrosion, and rated for corrosion on an arbitrary scale from 1 to 10, the numeral 1 indicating minimum corrosion and the numeral 10 indicating maximum corrosion. The trichloroethylene solvent mixture was filtered. Approximately 50 ml. of 0.1 N sodium hydroxide solution and water were added to the filtrate to make the final volume 500 ml. The final mixture was shaken and permitted to settle into an organic and an aqueous layer. Samples of the water layer were analyzed for total acidity by back titration of the base, and for chloride ion by electrometric titration. The figure $\Delta Cl^- \times 10^3$ moles, appearing in Table II, represents the amount of $Cl^-$ ion present at the start of the test and that which was present after the test was completed. Similarly, $\Delta H^+ \times 10^3$ moles is the amount of $H^+$ ion formed during the test. The various tests were performed in duplicate and the results recorded in Table II are an average of these duplicate runs. Percents given are by weight.

Table II

| Stabilizer System | Total Corrosion rating for all Metals | $\Delta Cl^- \times 10^3$ Moles | $\Delta H^+ \times 10^3$ Moles |
| --- | --- | --- | --- |
| 0.2% 3-methyl-1-pentyn-3-ol | 5.5 | 0.75 | 0.66 |
| 0.2% 3-methyl-1-pentyn-3-ol<br>0.1% dioxane | 4.4 | 0.36 | 0.38 |

Since many different embodiments of this invention may be made without departing from the spirit and scope thereof, it is to be understood that the invention should not be limited except as defined in the appended claims.

What we claim is:

1. A composition of matter consisting essentially of trichloroethylene tending to undergo degradation when exposed to heat, light and air, and a small but stabilizing amount of dioxane and a tertiary acetylenic monohydric alcohol effective to inhibit said degradation.

2. A composition of matter consisting essentially of trichloroethylene tending to undergo degradation when exposed to heat, light and air, and a small but stabilizing amount of dioxane and 3-methyl-1-pentyn-3-ol effective to inhibit said degradation.

3. A process for stabilizing trichloroethylene tending to undergo degradation when exposed to heat, light and air, which consists essentially of incorporating a small but stabilizing amount of dioxane and 3-methyl-1-pentyn-3-ol into said trichloroethylene effective to inhibit said degradation.

References Cited in the file of this patent

UNITED STATES PATENTS

| | | |
| --- | --- | --- |
| 2,371,645 | Aitchison et al. | Mar. 20, 1945 |
| 2,492,048 | Klabunde | Dec. 20, 1949 |
| 2,603,622 | Berger et al. | July 15, 1952 |
| 2,803,676 | Willis et al. | Aug. 20, 1957 |
| 2,838,458 | Bachtel | June 10, 1958 |